Patented Jan. 19, 1937

2,068,485

UNITED STATES PATENT OFFICE 2,068,485

COMPOSITION FOR REGENERATING AIR FOR BREATHING

Kurt A. Gerson, London, England

No Drawing. Application September 25, 1934, Serial No. 745,451

9 Claims. (Cl. 23—6)

This invention relates to oxygen-liberating compositions, more particularly to those comprising alkali peroxide for use in regeneration of exhaled air to render it fit for further breathing.

While the materials contemplated by the invention are capable of various uses, they are adapted particularly for use in breathing apparatus of the self-contained type, i. e., apparatus in which air exhaled by the user of the apparatus is passed through a regenerating composition to remove carbon dioxide, and usually water also, and to add to the air oxygen in an amount equivalent to the carbon dioxide, which air is then returned for further breathing. For this reason the invention may be described particularly with reference to such uses.

Compositions of the type referred to generally are made from metallic peroxides, most commonly from alkali peroxides, such as the alkali peroxides, especially those of sodium or potassium ($Na_2O_2$ or $K_2O_4$). The active agent in such a composition is the peroxide, which functions in the dual capacity of fixing carbon dioxide contained in the respired air brought into contact with the composition, and of simultaneously liberating oxygen for revivification of the air. Theoretically such compositions are adapted in such manner to maintain the air in physiologically correct balance for breathing. Practically, however, it has been found that in the use of such a self-contained apparatus the time of contact of the exhaled air with the regenerating composition is restricted and the carbon dioxide and water developed in respiration are insufficient to liberate the oxygen theoretically available in the composition. In order to overcome this difficulty water has been introduced to the compositions during the manufacture for assisting in and completing the reaction processes, especially during the initial period of use, as it has been a common experience that these compositions begin to function slowly.

Experience has shown, however, that these compositions as made heretofore have not been stable, the water present in the composition apparently causing a slow but continuous reaction. On the other hand, water is a desirable constituent of these compositions for the further reason that it induces autogenous bonding of the powdered materials into coherent masses adapted to withstand the conditions of normal use. That is, the materials are normally in a powdered condition, but powders can not be used in breathing apparatus, not only because a powder offers so much resistance to breathing as to render such a physical state totally unsuited for these purposes, but also because the powder might clog parts of the apparatus or be drawn into the respiratory tract with the possibility of consequent trouble. Therefore, it is necessary to bond materials of these types into aggregates which are porous, hard, do not crumble readily or rub away under the friction caused by movements or shock in shipment or in use of the apparatus. Water admirably serves these functions, causing an exothermic reaction to occur in the anhydrous peroxide composition which converts it to a coherent mass of porosity suitable for breathing apparatus purposes. Up to the present time, however, the compositions have suffered from the disadvantages referred to.

It is a major object of this invention to provide oxygen-liberating compositions of the general type referred to which possess adequate mechanical strength, are suitably porous and offer low breathing resistance, are more stable chemically than those available heretofore, in which the beneficial properties of water as a cementing, or bond-inducing medium are made use of, and which may be prepared by a procedure which is simple, inexpensive, easily performed, and efficient. A further object is to provide a method of regenerating air which overcomes disadvantages encountered heretofore, and affords economies in apparatus and efficiencies in operation as compared with prior practice.

The invention is predicated upon my discovery that its stated objects are attained by restricting the amount of water, in whatever form it is added to the anhydrous peroxide, to an amount preferably less but not more than about one-fourth mol. of water per mol. of anhydrous peroxide, and most suitably to an amount just sufficient to cause bonding of the peroxide. Such amounts of water are capable of affording satisfactory bonding of the composition, but I have discovered that they are insufficient to cause the slow but continuous reaction attended by evolution of oxygen which has characterized the compositions previously available.

In the practice of the invention anhydrous alkali peroxide, such as sodium or potassium peroxide, in finely divided form, is mixed with an amount of water adequate to cause the exothermic bonding reaction, care being taken to use not more than one-fourth mol. of water per mol.

of anhydrous peroxide, as just stated. The two materials are intimately mixed to disseminate the water uniformly throughout the mass, for example, by treatment in a ball mill. Thereafter the mixture is converted into a form suitable for use.

In the preferred practice the powdered mixture is compressed into shapes, and thereafter the shaped material is treated to cause the exothermic bonding reaction, as by heating it to a temperature adapted to initiate that reaction. For instance, the material may be heated to about 140° C. when a reaction occurs which causes the material to become hard and porous, and to be sufficiently coherent to resist all normal breaking or abrading actions.

The exact degree of pressure used will depend upon the manner in which the composition is to be used. By the use of very high pressures there is obtained a coherent and very hard mass of relatively low porosity, while with lower pressures the material is sufficiently coherent and hard but of relatively high porosity. The porosity can, therefore, be controlled through the degree of pressure applied. In general, pressures of 250 to 1000 atmospheres may be used.

If preferred for any reason the bonding reaction may be initiated directly in the intimate mixture of powder and water, as by spreading it out in layers in pans or trays and heating at a corner or edge to start the reaction, which then progresses throughout the mass, converting it to a coherent body which is very highly porous. The material is then granulated and shaped to prepare it for use. If the granules are relatively large the porosity may be adequate for direct use, but if the material be finely divided it must be shaped by pressure, but in fine grinding its porosity may be decreased or destroyed, so that in this modified procedure the porosity likewise is susceptible of control.

In effecting the steps just described use may be made of the protective procedure described in my copending application Serial No. 733,121, filed June 29, 1934, an object of which is to minimize loss of oxygen from the anhydrous peroxide during manufacture of the composition. In accordance with that invention the alkali peroxide is protected from the influence of the atmosphere, more particularly during and after the addition of water. In the preferred practice of that invention the material is protected by a fluid medium which is inert with respect to the alkali peroxide, or alkali peroxide hydrate, and intervenes between it and the neighboring atmosphere to minimize or prevent access of the atmosphere thereto. By isolating the mass from the atmosphere premature attack of moisture and carbon dioxide upon the highly reactive peroxide is prevented, so that the resultant composition retains all of its available oxygen.

The fluid protecting medium may be a gas or a vapor, or it may be a liquid, preferably a volatile liquid whose vapor is heavier than air. If a gas or vapor be used it may be introduced as such into the reaction vessel or grinding apparatus, or it may be evolved in situ from a liquid added to the medium. More suitably, however, there is used a readily vaporizable liquid, such as the chlorine substitution products of hydrocarbons, especially of the paraffin series, carbon tetrachloride being the preferred example. Such materials are advantageous because they vaporize readily to form a heavy vapor which satisfactorily blankets the composition from the atmosphere, and because the material is inert to the peroxide compositions and is ordinarily expelled during the bonding reaction.

Although reference has been made to the use of water in the preparation of the compositions in accordance with the present invention, it will be evident to those skilled in the art that hydrated alkali peroxides and hydrated derivatives of alkali peroxides may similarly be used to supply water, the hydrate being used in such an amount as to provide water in the restricted amount which characterizes this invention. Various peroxide hydrates are known and may be used for this purpose. In this aspect of the invention the materials are treated as described hereinabove.

In the prior compositions relatively large amounts of water have been used not only for the purpose described, but also to initiate reaction promptly upon passage of respired air into contact with the compositions. In the practice of this invention the amount of water used is so small as to exert no substantial effect in the reaction between the composition and the respired air, so that its initiatory effect is absent. I have found, however, that this is compensated for by the fact that the material produced by this invention may be packed en masse in the regenerating canister, or cartridge, so that the heat of the exhaled air, and such heat as is caused by reaction of the constituents ($CO_2$, $H_2O$) of the air and the composition, is not rapidly dissipated but rather is retained and accumulated owing to the bulk and close packing of the material. Thus the temperature of the composition is raised relatively rapidly to, or close to, the decomposition temperature, causing the desired regenerating reaction to be initiated promptly and with the necessary efficiency, and to proceed to completion in the desired manner, thus liberating the total oxygen available in the composition. The water and carbon dioxide contained in the exhaled air assist in initiating and maintaining the reaction.

The ability to use this composition in such a manner is an advantage over prior compositions for economical reasons also. Thus with prior compositions it was necessary to pack the material on separating screens mounted in the cartridges. This was necessary in order to provide satisfactorily low breathing resistance, and to maintain the air passages free during the life of the cartridge. Such constructions entail additional cost, and increase the weight and bulk of the cartridges, as compared with the simple loose filling used in the present invention. Also, in such a construction heat imparted to the composition may be dissipated so rapidly that water is necessary to assist in initiating or maintaining reaction.

I have found also that the products formed in accordance with this invention do not become stuck together as have those produced heretofore, and throughout their life the breathing resistance does not become excessive. In this connection the use of a restricted amount of water appears to be beneficial because there is not sufficient water present to cause the formation of a pasty mass which, obviously, would unduly increase breathing resistance, so that during the life of a cartridge made from the compositions provided by this invention its breathing resistance always remains in usable limits.

If desired for any reason various other modifications are possible without departing from the spirit of the invention. For instance, there may be added to the compositions other materials than those specifically referred to. Among these are catalysts intended to assist in the reactions involved in the use of these compositions, such as those heretofore known for this purpose.

Thus by restricting the use of water to that necessary for the exothermic bonding reaction the invention provides peroxide compositions which are stable, porous, satisfactorily reach the reaction temperature necessary for use, do not increase unduly in breathing resistance during use, and which are free from, or in which there are minimized, disadvantages and difficulties encountered in the previous practice of using larger amounts of water.

According to the provisions of the patent statutes, I have explained the principle of my invention and have described what I now consider to represent its best embodiment. However, I desire to have it understood that, within the scope of the appended claims the invention may be practiced otherwise than as specifically described.

I claim:

1. In a process of preparing an oxygen-liberating composition from an alkali peroxide, the steps comprising providing an intimate mixture of said peroxide and water in an amount sufficient to cause bonding of the peroxide but not more than about one-fourth mol. of water per mol. of peroxide, and heating said mixture to cause bonding reaction therein.

2. In a process of preparing an oxygen-liberating composition from an alkali peroxide, the steps comprising providing an intimate mixture of anhydrous alkali peroxide and hydrated alkali peroxide, said hydrated peroxide being in an amount to provide water sufficient for bonding of the peroxide but not more than about one-fourth mol. of water per mol. of peroxide, and heating said mixture and thereby causing bonding reaction therein.

3. In a process of preparing an oxygen-liberating composition from an alkali peroxide, the steps comprising providing an intimate mixture of said peroxide and water in an amount sufficient to cause bonding of the peroxide but not more than about one-fourth mol. of water per mol. of peroxide, shaping said mixture by application of pressure thereto, and heating the pressed mixture to cause bonding reaction and production of porosity therein.

4. In a process of preparing an oxygen-liberating composition from an alkali peroxide, the steps comprising providing an intimate mixture of said peroxide and water in an amount sufficient to cause bonding of the peroxide but not more than about one-fourth mol. of water per mol. of peroxide, shaping said mixture by application of 250 to 1000 atmospheres pressure thereto, the pressure varying in accordance with the degree of porosity desired in the final product, and heating the pressed mixture to cause bonding reaction and production of porosity therein.

5. In a process of preparing an oxygen-liberating composition from an alkali peroxide, the steps comprising providing an intimate mixture of said peroxide and water in an amount sufficient to cause bonding of the peroxide but not more than about one-fourth mol. of water per mol. of peroxide, protecting said mixture from the atmosphere by a fluid medium inert with respect to the peroxide, shaping the mixture, and heating the shaped mixture to cause bonding reaction and production of porosity therein.

6. A composition for liberating oxygen upon contact with carbon dioxide and water, as by exhaled air, comprising alkali peroxide and water in an amount sufficient to cause bonding but not more than about one-fourth mol. per mol. of said peroxide.

7. As a new article of manufacture, an oxygen-liberating composition, comprising coherent and porous aggregates of alkali peroxide containing sufficient water to cause bonding but not more than one-fourth mol. of water per mol. of peroxide.

8. That method of regenerating exhaled air to render it fit for breathing, comprising passing the air as it is exhaled into contact with a regenerating composition comprising alkali peroxide containing not more than one-fourth mol. of water per mol. of peroxide, thereby exchanging carbon dioxide of the exhaled air for oxygen, and returning the regenerated air for further breathing.

9. That method of regenerating exhaled air to render it fit for breathing, comprising passing the air in closed circuit into contact with a body en masse of granules or aggregates of regenerating composition comprising alkali peroxide containing not more than one-fourth mol. of water per mol. of peroxide, thereby exchanging carbon dioxide of the exhaled air for oxygen, and returning the regenerated air for further breathing.

KURT A. GERSON.